Patented July 25, 1950

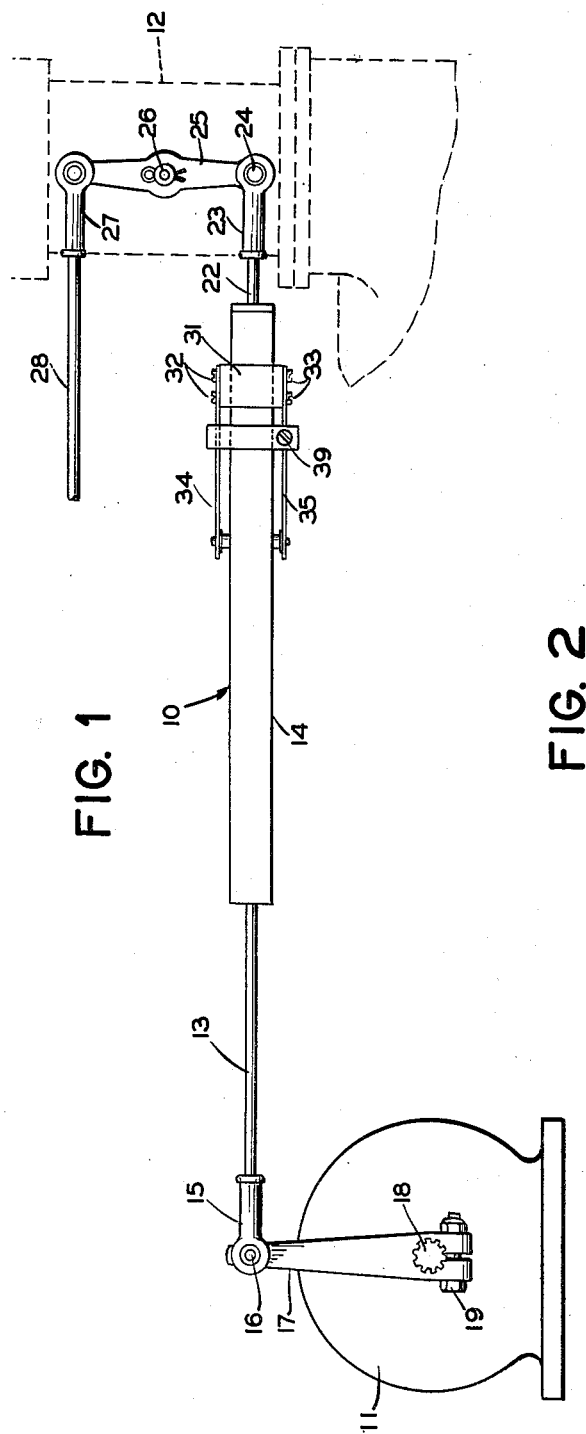
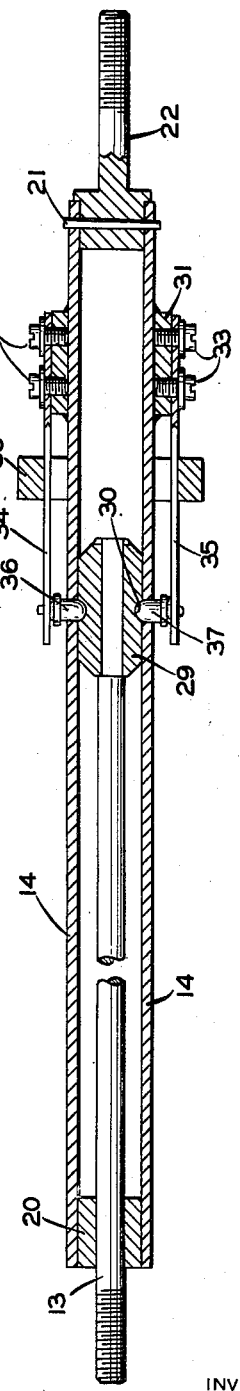

2,516,642

UNITED STATES PATENT OFFICE 2,516,642

RECONNECTIBLE DISCONNECT FOR RECIPROCATING CONTROL RODS

Norman B. Murphy, Tenafly, N. J., assignor to Bendix Aviation Corporation, Teterboro, N. J., a corporation of Delaware Application December 27, 1948, Serial No. 67,493

4 Claims. (Cl. 74—469)

This invention generally relates to drivable connections between a controlled and a controlling member and more particularly to a drivable connection which is readily releasable in the event of an emergency arising out of failure of the controlling member so that continued operation of the controlled member may be effected manually.

With the advent of numerous controls utilized in the automatic flight control of modern aircraft such as motor driven craft surfaces, engine speed controls, etc., it has become necessary to provide readily disconnectable or releasable driving connections between the controlling and the controlled members whereby upon failure of a controlling member, manual operation of the controlled member may be readily assumed free of the necessity of manually overcoming the load provided by the controlling member which may have failed.

While various connectable and releasable driving connections to this end have been heretofore suggested, the present invention contemplates the provision of a novel, simple and inexpensive releasable driving connection which is particularly suitable for use, though not necessarily limited thereto, between a carburetor throttle valve and a throttle servo motor which is energized in response to radio waves, for example, for controlling craft speed of descent or ascent along a radio beam to or away from a desired destination at which a radio transmitter is located.

An object of the present invention, therefore, is to provide a novel releasable driving connection between a controlled and a controlling member.

Another object of the invention is to provide a novel releasable driving connection between a controlled and a controlling member which may be readily overpowered manually to permit manual operation of the controlled member regardless of the position of the controlling member and also regardless of whether the controlling member may have failed or not.

A further object is to provide a novel releasable driving connection of the character described which, subsequent in disengaging operation, may be easily re-engaged during flight to re-establish the driving connection.

A still further object of the invention is to provide a novel releasable driving connection which may be adjusted for response to any desired load required for overpowering the operation of a controlled member by a controlling member.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

In the drawing, wherein like reference characters refer to like parts in both views, Figure 1 is a side elevation view of the novel releasable driving connection of the present invention shown as interconnecting a driving motor and a carburetor throttle valve; and, Figure 2 is an enlarged view, partly in section, of the novel releasable control of Figure 1.

Referring now to the drawing for a more detailed description of the present invention, the novel releasable driving connection hereof, generally designated with the reference character 10, for interconnecting a servo motor 11 and a carburetor 12, or any other desired controlling and controlled member, is shown as generally consisting of a shaft or rod 13 and a hollow tube 14 sleeved on the rod for either axial movement therewith or relative thereto.

One end of rod 13 is suitably fastened within a hollow connecting rod 15 which is connected by way of a pin 16 with one end of a driving arm 17 whose other end is split for embracing a shaft 18 of motor 11. A bolt 19 may be provided as shown for rigidly fastening driving arm 17 to motor shaft 18, it being understood that the latter is driven by the motor through a speed reduction gearing (not shown) so that movement of the driving arm 17 is confined to a given limited arc.

Hollow tube 14, on the other hand, which may be fixed for movement with rod 13 or which may be moved axially relative to the rod in a manner to fully appear hereinafter, has one end thereof provided with a hollow insert 20 (Figure 2) which slidably mounts rod 13 therein and has the other end thereof fastened by way of a pin 21 to the enlarged end of a rod 22 whose opposite end, in turn, is suitably fastened within a hollow connecting rod 23, the latter being pivotally connected by way of a pin 24 to one end of a carburetor bar 25. The latter bar is pivotally mounted at an intermediate point thereof by way of a shaft 26 on the carburetor housing, the bar connecting with a throttle valve (not shown) to be controlled by motor 11. The opposite end of bar 25 pivotally supports a hollow connecting rod 27 which has a rod or cable 28 suitably connected thereto, the rod or cable 28 extending to the pilot's compartment and provided with a handle or lever (not shown).

by virtue of which the throttle may be operated manually by the pilot.

In accordance with the present invention, novel coupling and un-coupling means are provided for positively connecting hollow tube 14 with rod 13 to thereby establish a drivable connection between the carburetor throttle valve and the driving motor. For this purpose, the free end of rod 13, within tube 14, has suitably fastened thereto an enlarged member 29 whose outer wall is in sliding engagement with the inner wall of tube 14 and which is provided with an endless groove 30 in its outer wall.

An outer wall of tube 14, on the other hand, supports a spacer element 31 thereon which has anchored thereto at opposite points thereof by way of suitable screws 32 and 33, like ends of a pair of elongated spring elements 34 and 35, respectively. The opposite end of each spring element has a button or detent 36 and 37 suitably attached thereto which, in response to spring pressure, are normally urged through suitable openings, formed in the wall of tube 14, to be received within and cooperate with groove 30 of enlarged member 29. With detents 36 and 37 registering with groove 30, such registry being maintained by the inward pressure provided by the spring elements, a positive driving connection is defined between tube 14 and rod 13 so that for any movement of driving arm 17, carburetor bar 25 will be moved a corresponding amount.

A split slide collar 38 is sleeved about spring elements 34 and 35 and is provided with a screw 39 by virtue of which the collar may be positioned at any desired point relative to the spring elements to thereby regulate the spring pressure applied on the detents so that the load necessary to be applied to manual cable 28 to cam the detents out of registry with their cooperating groove 30 and thereby overpower the driving connection between rod 13 and tube 14 can be readily adjusted.

It will now be apparent from the foregoing that with the various parts positioned as shown in the drawing wherein detents 36 and 37 are in registry with groove 30, any motion imparted to driving arm 17 by servo motor 11 is transferred to carburetor bar 25 by rod 13 and tube 14 through the novel coupling device hereof.

If, in the event of a power failure in the circuit controlling the operation of servo motor 11 or for some other reason, it becomes necessary or desirable to control the throttle valve manually, the pilot need merely grasp the throttle lever, associated with cable 28, and apply a manual force thereto sufficient to cam detents 36 and 37 out of registry with groove 30. Operation of the cable will displace carburetor bar 25 sufficiently to impart to tube 14 an axial motion relative to rod 13 to force the detents out of their cooperating groove. When this occurs, the driving connection to the motor is overpowered and the throttle valve is placed under direct manual control by the pilot providing the latter with complete freedom of control regardless of the position of driving arm 17. Where, after a period of time, it is desired to re-enstate throttle control by the motor, carburetor bar 25 may be moved slowly by the pilot to move tube 14 slowly relative to rod 13 until a position is attained in which the openings within the wall of the tube register with groove 30. At this point detents 36 and 37 will be placed in registry with the groove by the spring elements to thereby re-establish the positive driving connection between the motor and the throttle valve.

There has thus been provided a novel, simple and reliable releasable driving connection for use between a driving and driven element which can be quickly overpowered and re-established as desired.

Although but a single embodiment of the present invention has been illustrated and described in detail, it is to be expressly understood that the invention is not limited thereto. While but one pair of spring carried detents has been shown, for example, additional pairs may be utilized in which event a corresponding additional number of openings would be provided in the wall of tube 14. The rod 13 and tube 14 may be cylindrical or of any other desired form in which event the member 29 and insert 20 would assume a corresponding form. Various other changes may be made in the design and arrangement of the parts without departing from the spirit and scope of the invention as the same will now be understood by those skilled in the art.

I claim:

1. A releasable driving connection adapted for drivably connecting a controlled member to a controlling member comprising an axially movable rod adapted for connection to one of said members and having registering means thereon in the form of an endless peripheral groove, a hollow tube sleeved about said rod mounted for axial movement relative to said rod and adapted for connection to the other of said members, a wall of said tube being provided with at least one opening adapted for alignment with said registering means, means comprising at least one yieldably urged detent supported by said tube and associated with said opening for registry with said registering means to define a drivable connection between said members, and means adapted for manual operation associated with said tube for camming said detent means out of said registering means to thereby overpower said drivable connection.

2. A releasable driving connection adapted for drivably connecting a controlled member to a controlling member comprising an axially movable rod adapted for connection to one of said members and having an enlarged end provided with registering means thereon, a hollow tube sleeved on said rod and slidably supported by the enlarged end thereof for axial movement relative to said rod and adapted for connection to the other of said members, a wall of said tube being provided with a pair of oppositely arranged openings adapted for alignment with said registering means, a spacer element on an outer wall of said tube, means comprising a pair of oppositely arranged yieldable detent means anchored to said element and associated with said openings for registry with said registering means to define a drivable connection between said members, and means adapted for manual operation associated with said tube for withdrawing said detent means from said registering means to thereby overpower said drivable connection.

3. A releasable driving connection adapted for drivably connecting a controlled member to a controlling member comprising an axially movable rod adapted for connection to one of said members and having an enlarged end provided with registering means thereon, a hollow tube sleeved on said rod and slidably supported by the enlarged end thereof for axial movement relative to said rod and adapted for connection to the other of said members, a wall of said tube being provided with a pair of oppositely arranged openings adapted for alignment with said registering means, a spacer element on an outer wall of said tube, a pair of detents associated with said openings, a pair of elongated spring elements anchored to said spacer element and urging said detents into registry with said registering means to define a drivable connection between said members, means adapted for manual operation associated with said tube for withdrawing said detents from said registering means to thereby overpower said drivable connection, and a slidable collar associated with said springs for determining the effective tension of the latter.

4. A releasable driving connection for use between a servo motor and a throttle valve comprising an axially movable rod adapted for connection with said motor and having registering means thereon in the form of an endless peripheral groove, a hollow tube sleeved about said rod mounted for axial movement relative to said rod and adapted for connection to said valve, yieldably urged detent means supported by said tube for registry with said registering means to establish a driving connection between said motor and valve, and means adapted for manual operation associated with said valve for overpowering said driving connection by withdrawing said detent means from said registering means.

NORMAN B. MURPHY.

REFERENCES CITED

The following references are of record in the file of this patent:

UNITED STATES PATENTS

| Number | Name | Date |
|--------|------|------|
| 220,395 | Leslie | Oct. 7, 1879 |
| 980,400 | Bernstein | Jan. 3, 1911 |
| 1,131,161 | Root | Mar. 9, 1915 |
| 2,229,473 | Redmer | Jan. 21, 1941 |